(12) United States Patent  
Apairmarn et al.

(10) Patent No.: US 9,123,364 B1
(45) Date of Patent: Sep. 1, 2015

(54) BASE PLATE WITH RELIEF RING FOR SUSPENSION ASSEMBLY WITH MODIFIED DEFORMATION CHARACTERISTICS

(71) Applicant: Seagate Technology LLC, Cupertino, CA (US)

(72) Inventors: Prapan Apairmarn, Bangkok (TH); Rapeepat Weerachatpitucchon, Chanthaburi (TH); Piriyakorn Jirawattanakasem, Samutprakarn (TH); Joompondej Bamrungwongtaree, Bangna (TH)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/640,118

(22) Filed: Mar. 6, 2015

Related U.S. Application Data

(60) Provisional application No. 61/949,375, filed on Mar. 7, 2014.

(51) Int. Cl.
*G11B 5/39* (2006.01)
(52) U.S. Cl.
CPC ........................................ *G11B 5/39* (2013.01)
(58) Field of Classification Search
CPC .. G11B 5/4813; G11B 5/4826; G11B 5/4833; G11B 5/48; G11B 5/4806; G11B 5/50; G11B 5/5521

USPC ....................................................... 360/244.6
See application file for complete search history.

(56) References Cited

U.S. PATENT DOCUMENTS

| | | | |
|---|---|---|---|
| 5,717,545 A | 2/1998 | Brooks, Jr. et al. | |
| 6,368,685 B1 * | 4/2002 | Schmidt et al. | 428/34.1 |
| 6,399,179 B1 | 6/2002 | Hanrahan et al. | |
| 6,697,224 B2 | 2/2004 | Wang et al. | |
| 6,757,136 B2 | 6/2004 | Buske et al. | |
| 6,940,696 B2 | 9/2005 | Takagi et al. | |
| 7,130,156 B1 | 10/2006 | Fossum | |
| 7,633,717 B1 | 12/2009 | Fossum et al. | |
| 8,049,995 B1 | 11/2011 | Ee et al. | |
| 9,013,833 B2 * | 4/2015 | Aparimarn et al. | 360/244.6 |
| 2002/0145830 A1 | 10/2002 | Wang et al. | |
| 2003/0231432 A1 * | 12/2003 | Bhattacharya et al. | 360/244.2 |
| 2005/0078407 A1 | 4/2005 | Diewanit et al. | |
| 2006/0044693 A1 | 3/2006 | Shimozato | |
| 2006/0174472 A1 | 8/2006 | Zhang et al. | |
| 2007/0146934 A1 * | 6/2007 | Boljanovic et al. | 360/244.6 |
| 2014/0268425 A1 * | 9/2014 | Aparimarn et al. | 360/244.6 |

* cited by examiner

*Primary Examiner* — Mark Blouin
(74) *Attorney, Agent, or Firm* — Kagan Binder, PLLC

(57) ABSTRACT

A base plate system including a base plate with first and second opposite surfaces, a boss tower extending from the first surface of the base plate and having an outer surface, a swaging hole extending through a height of the boss tower and a height of the base plate, and a relief channel recessed in the first surface of the base plate and extending around at least a portion of the outer surface of the boss tower, wherein the relief channel comprises a shape that is different from a shape of the outer surface of the boss tower.

20 Claims, 7 Drawing Sheets

BASE PLATE WITH RELIEF RING FOR SUSPENSION ASSEMBLY WITH MODIFIED DEFORMATION CHARACTERISTICS

PRIORITY

The present nonprovisional patent Application claims priority under 35 U.S.C. §119(e) from United States Provisional patent application having Ser. No. 61/949,375, filed on Mar. 7, 2014, by Aparimarn et al. and titled "BASE PLATE WITH RELIEF RING FOR SUSPENSION ASSEMBLY WITH MODIFIED DEFORMATION CHARACTERISTICS," wherein the entirety of said provisional patent application is incorporated herein by reference.

BACKGROUND

Hard disk drive systems (HDDs) typically include one or more data storage disks. A transducing head carried by a slider is used to read from and write to a data track on a disc. The slider is carried by an arm assembly that includes an actuator arm and a suspension assembly.

A swaging process is a common material processing technique used to connect the suspension assembly to the actuator arm. The suspension assembly includes a boss tower configured to fit within an aperture in the actuator arm. When a swage ball is passed through the boss tower when fitted in the arm aperture, the boss tower expands, thereby contacting the aperture surface and creating a frictional engagement or interference fit that connects the suspension assembly to the actuator arm. There is a need to provide additional component configurations and techniques to improve the swage effect in a swaging process, such as techniques that can minimize the amount of base plate deformation that occurs.

SUMMARY

The present invention relates to disk drives. More particularly, the invention provides a head-gimbal assembly that is attached to an actuator arm by a swaging process, wherein a base plate includes a relief channel recessed into its upper surface that has a shape that is different from a shape of the outer surface of its extending boss tower. In a specific example, the relief channel is oval or elliptical in shape, while the outer perimeter of the boss tower has a circular shape. In general, the invention is used for a hard disk apparatus, but it is understood that that the invention has a much broader range of applicability.

In one aspect of the present invention, a base plate system is provided, which includes a base plate comprising first and second opposite surfaces, a boss tower extending from the first surface of the base plate and having an outer surface, a swaging hole extending through a height of the boss tower and a height of the base plate, and a relief channel recessed in the first surface of the base plate and extending around at least a portion of the outer surface of the boss tower, wherein the relief channel comprises a shape that is different from a shape of the outer surface of the boss tower. In a specific embodiment, the outer surface of the boss tower has a circular shape, while the relief channel has an oval or elliptical shape. This base plate system is also provided in combination with an actuator arm and head suspension assembly in a head stack assembly, wherein the actuator arm includes an actuator arm aperture, and wherein the head suspension assembly includes a load beam having a mounting region with a load beam aperture.

In another aspect of the invention, a head stack assembly is provided that includes an actuator arm having an aperture therein, a head suspension assembly including a load beam having a mounting region with an aperture therein, and a base plate adapted to attach the head suspension assembly to the actuator arm. In this aspect, the base plate includes a boss tower having an outer surface, a flange extending outwardly from a first end of the boss tower, and a relief channel recessed in a first surface of the flange and extending around at least a portion of the outer surface of the base tower, wherein the relief channel comprises a shape that is different from a shape of the outer surface of the boss tower. In a specific embodiment, the outer surface of the boss tower has a circular shape, while the relief channel has an oval or elliptical shape.

These and various other features and advantages will be apparent from a reading of the following detailed description.

BRIEF DESCRIPTION OF THE DRAWINGS

The present invention will be further explained with reference to the appended Figures, wherein like structure is referred to by like numerals throughout the several views, and wherein.

DETAILED DESCRIPTION

In general, swaging is a material processing technique used to connect various elements, and for a hard disk apparatus, swaging is commonly used to form a head stack assembly. During the process, a boss tower is expanded to attach a load beam of a head gimbal assembly to an actuator arm or E-block. In accordance with the present invention, a base plate from which a boss tower extends includes a relief channel or ring that has a different shape from the shape of the outer perimeter of the boss tower. In a specific embodiment, the shape of the outer perimeter of the boss tower is circular and the shape of the relief channel is non-circular, such as oval or elliptical. The non-circular shape of the relief channel can minimize deformation of the actuator arm caused by the swaging process. The result is improved overall quality of the head stack assembly due to decreased distortion (e.g., bending up or down) of the actuator arm.

Figure 1:
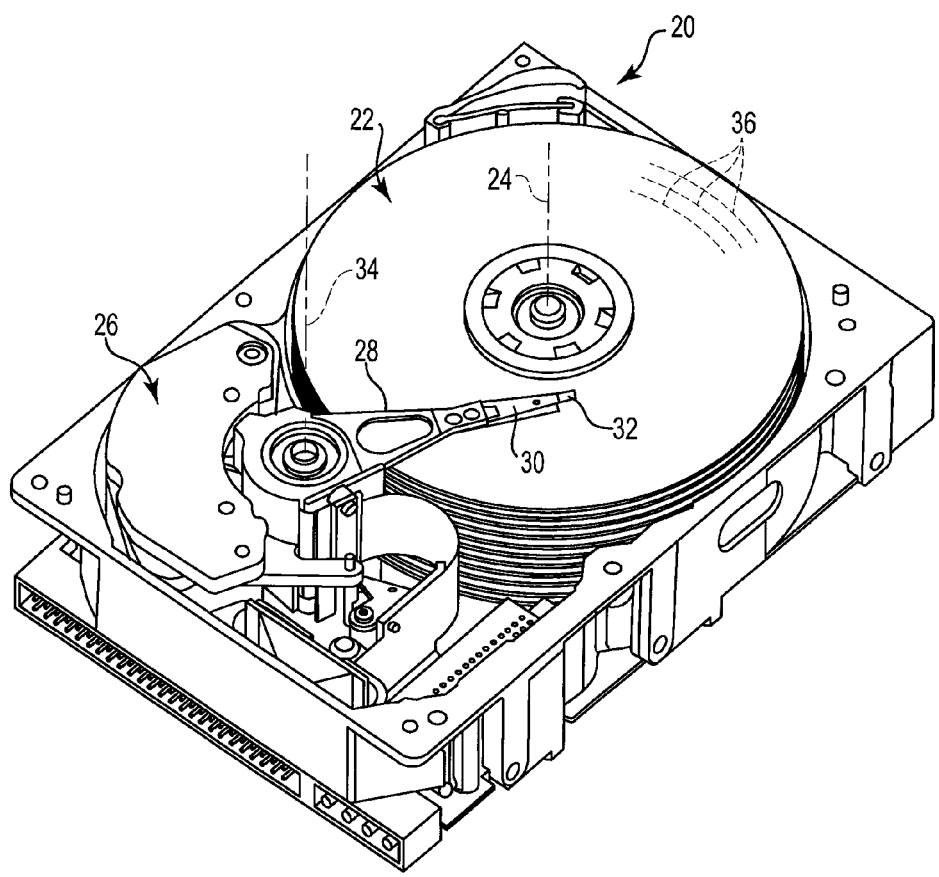
FIG. 1 is a perspective view of an exemplary hard disk drive (HDD) system.
Figure 2:
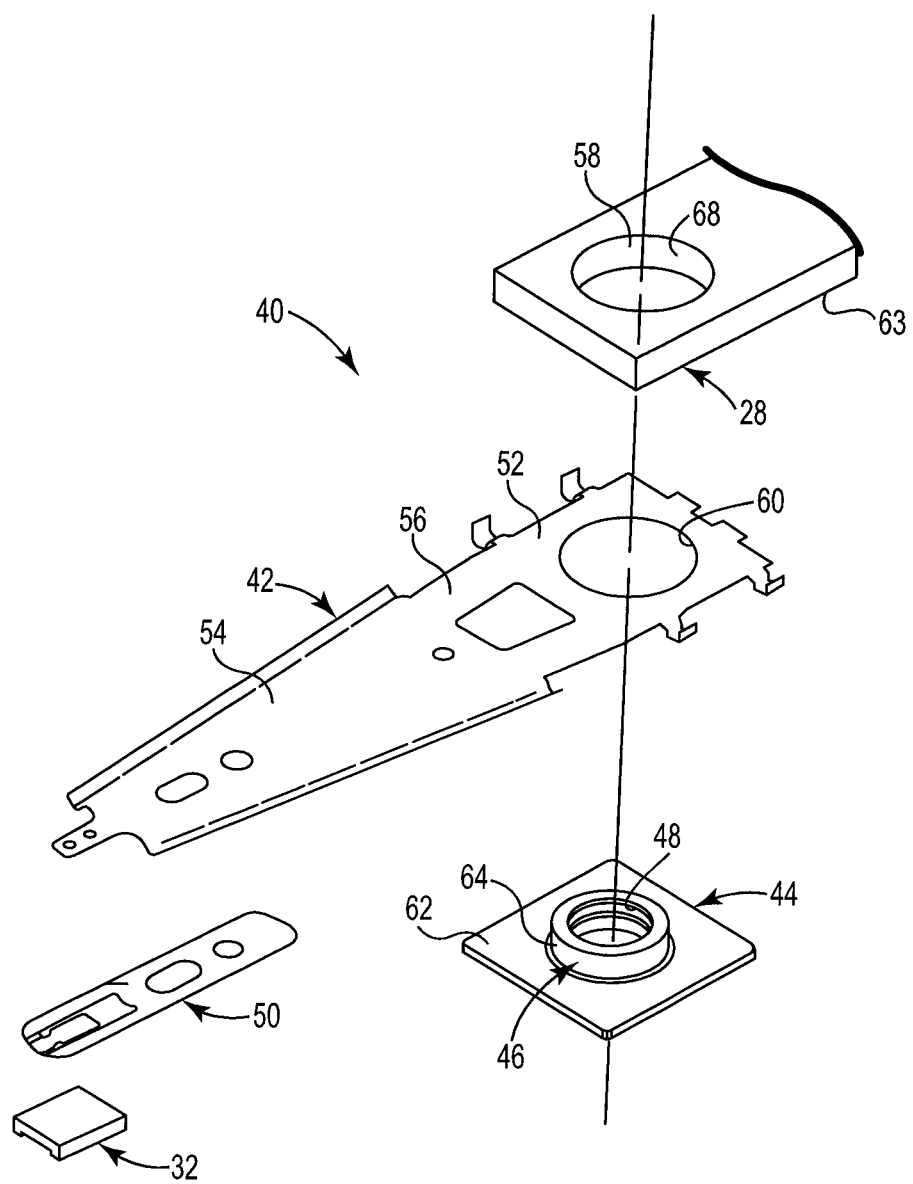
FIG. 2 is a perspective view of an exploded head stack assembly of the type that can be used in an HDD system such as that illustrated in FIG. 1.

Referring now to the Figures, wherein the components are labeled with like numerals throughout the several Figures, and initially to FIG. 1, an exemplary configuration of a typical hard disk drive (HDD) system 20 is illustrated. The HDD system generally includes at least one magnetic storage disk 22 configured to rotate about an axis 24, an actuation motor 26 (e.g., a voice coil motor), an actuator arm 28, a suspension assembly 30 that includes a load beam, and a slider 32 carrying a transducing or read/write head (not shown). Slider 32 is supported by suspension assembly 30, which in turn is supported by actuator arm 28. Together, actuator arm 28, suspension assembly 30 and slider 32 form a head stack assembly (HSA). Actuation motor 26 is configured to pivot actuator arm 28 about an axis 34, in order to sweep suspension 30 and slider 32 in an arc across a surface of rotating disk 22 with slider 32 "sliding" or "flying" across disk 22 on a cushion of air, often referred to as an air bearing. The read/write head carried by slider 32 can be positioned relative to selected concentric data tracks 36 of disk 22 by a piezoelectric microactuator, not seen in FIG. 1. A stack of co-rotating disks 22 can be provided, with additional actuator arms 28, suspension assemblies 30, and sliders 32 carrying read/write heads for reading and writing at top and bottom surfaces of each disk 22 in the stack FIG. 2 is an exploded, isometric view of a typical head stack assembly (HSA) 40 of FIG. 1, which includes a load beam 42, actuator arm 28, and a base plate 44 with an upwardly projecting boss tower 46. In the illustrated embodiment, HSA 40 includes a flexure piece 50 to which slider 32 (which includes a transducing or read/write head) is mountable. Flexure 50 may be attached to load beam 42 by any conventional mechanism or may be integral with load beam 42. In some embodiments, load beam 42, flexure 50 and slider 32 can be referred to as a head suspension assembly. Load beam 42 includes a mounting region 52 at a proximal end, a rigid region 54 adjacent to the distal end of the load beam 42, and a spring region 56 between the mounting region 52 and rigid region 54. An aperture 60 is present in mounting region 52. Spring region 56 is relatively resilient and provides a downward bias force at the distal tip of load beam 42 for holding the slider 32 with read/write head near a spinning disk in opposition to an upward force created by the air bearing over the disc. HSA 40 is typically coupled to actuation motor 26 (FIG. 1) via actuator arm 28 that is attached to mounting region 52 of load beam 42.

A swage-type attachment is often used to attach load beam 42 (at mounting region 52) to actuator arm 28. An aperture 58 of actuator arm 28 and an aperture 60 of load beam 42 are shaped and sized to receive boss tower 46 of base plate 44. Boss tower 46 has an outer surface 64 and an inner swaging aperture or hole 48 that passes through the height of boss tower 46 and base plate 44. In some embodiments, the entire height of outer surface 64 is perpendicular to the base plate 44 from which boss tower 46 extends. To swage load beam 42 to actuator arm 28, actuator arm 28, load beam 42 and base plate 44 are aligned with boss tower 46, and then the boss tower 46 is inserted through load beam aperture 60 and actuator arm aperture 58. At this point, mounting region 52 is sandwiched between base plate 44 (specifically, a surface 62 of base plate 44) and actuator arm 28 (specifically, a surface 63 of arm 28). Outside surface 64 of boss tower 46 is sized to fit within inner surface 68 of aperture 58 of actuator arm 28. Outside surface 64 is typically adjacent to inner surface 68, although the amount of engagement before swaging may vary.

One or more swaging balls will then be forced through swaging hole 48 to expand boss tower 46 relative to actuator arm aperture 58. This expansion creates a frictional attachment interface between outside surface 64 of boss tower 46 and interior surface 68 of actuator arm aperture 58. In some embodiments, a frictional attachment may also occur at load beam aperture 60. When passed through swage hole 48 and apertures 58, 60, the swaging ball typically engages the inner surface of swage hole 48 (which is the inner surface of boss tower 46) generating an outwardly directed force against the surface and deforming boss tower 46 so that outer surface 64 frictionally engages inner surface 68 of arm aperture 58. If swage hole 48 and swaging ball are symmetrical, the force will radiate concentrically outward in a generally uniform manner. A subsequent swaging ball of greater diameter can then optionally be used to further expand boss tower 46 and increase the engagement between surface 64 and surface 68.

Figure 3:
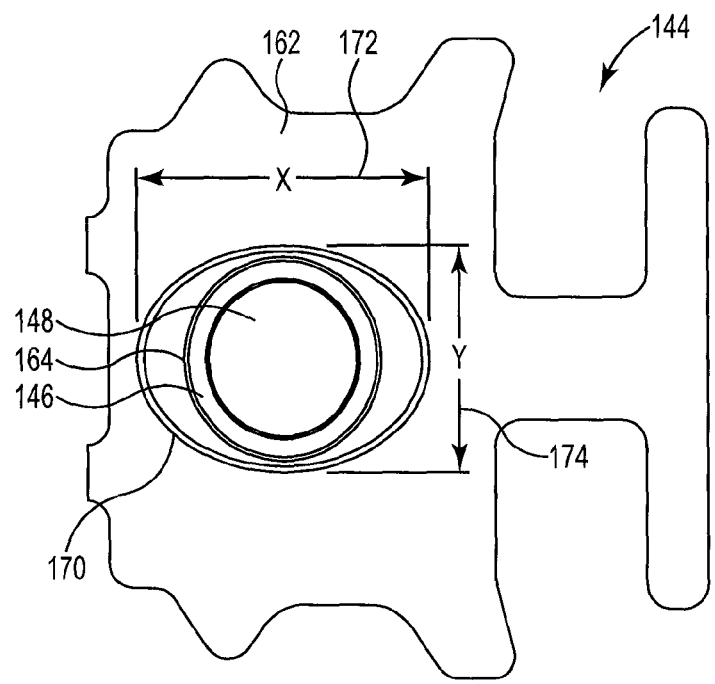
FIG. 3 is a top view of a base plate with an extending boss tower for a head stack assembly, according to one aspect of the present invention.
Figure 4:
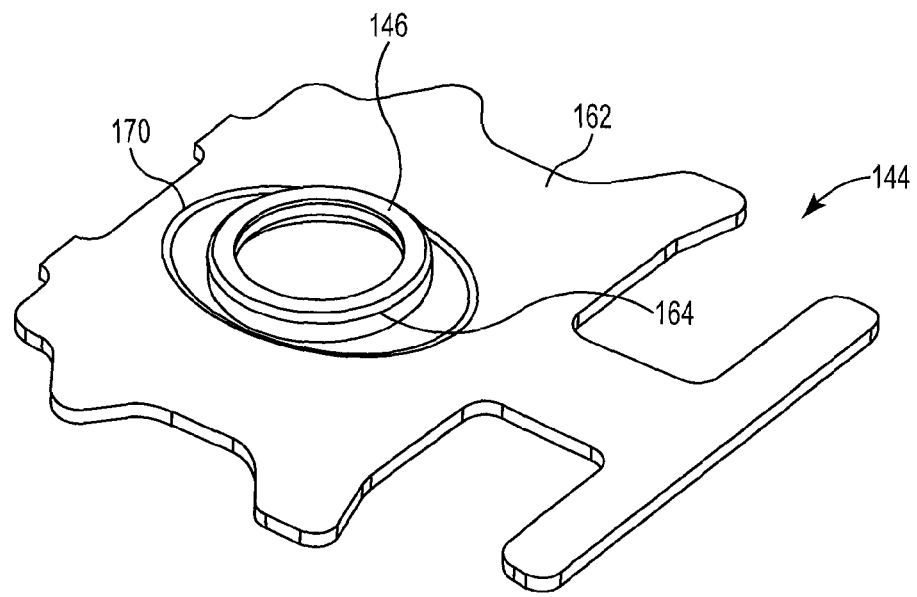
FIG. 4 is a perspective view of the base plate of FIG. 3.

Referring now to FIGS. 3 and 4, an exemplary embodiment of a base plate 144 is illustrated, in accordance with an embodiment of the invention. Base plate 144 includes a first or top surface 162, from which a boss tower 146 projects. The boss tower 146 includes a swage hole 148 extending through its height and through the thickness of the base plate 144, wherein both the swage hole 148 and an outer surface 164 of boss tower 146 are generally circular in shape, such that the boss tower 146 has a generally cylindrical configuration. The base plate 144 further includes a relief channel or ring 170 that is recessed into the first surface 162, which is generally positioned to surround the boss tower 146. The relief channel or ring 170 has a shape that is different from that of the swage hole 148 and/or the outer surface 164 of the boss tower 146. In one particular embodiment, the shape of the relief channel or ring 170 is oval or elliptical, as shown, wherein channel 170 has a dimension 172 in the x-direction (i.e., the roll direction) that is larger than a dimension 174 in the y-direction (i.e., the pitch direction), as is best illustrated in FIG. 3.

As shown in FIG. 3, the relief channel 170 is positioned relative to the boss tower 146 so that the relief channel 170 is symmetrically located relative to the outer surface of the boss tower 146 in both the x-direction and the y-direction. That is, the boss tower 146 is evenly spaced on both sides from the relief channel 170 in the x-direction and also evenly spaced on both sides from the relief channel 170 in the y-direction. In an alternative embodiment, the relief channel 170 is positioned relative to the boss tower 146 in such a way that there is different spacing between the relief channel 170 and the boss tower 146 in at least one of the x-direction and/or y-direction (i.e., asymmetrical positioning of the boss tower 146 from the relief channel 170 relative to the dimension 172 and/or the dimension 174).

The oval or elliptical shape of the relief channel described above has been found to reduce deformation of the base plate during the swaging process when used in a swaging process that involves a round boss tower. That is, the asymmetry of the relief channel width as compared to the configuration of the boss tower provides for less deformation of the base plate than when a circular relief channel is concentrically arranged relative to a round boss tower.

It is further contemplated that the relief channel can have noncircular shapes other than oval or elliptical, such as triangular, rectangular, square, and the like, wherein such shapes can either be symmetric or non-symmetric about a center line and positioned in a variety of orientations relative to the boss tower. In addition, the relief channel can be provided as either a continuous channel that extends as a non-broken ring around the boss tower (as is shown and discussed above), or can instead be a broken ring that extends in sections generally around the boss tower, but that has portions where there is no recess for the channel. In addition, while it is contemplated that the relief channel has the same depth around its perimeter, the relief channel can alternatively have at least one section with a different depth than other sections.

Figure 5:
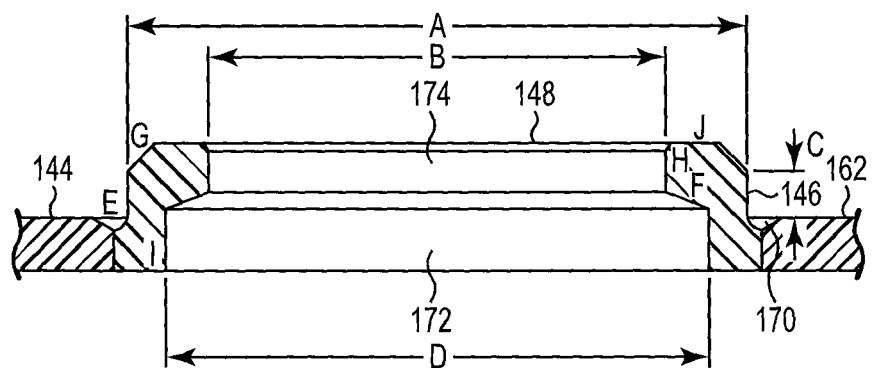
FIG. 5 is a cross-sectional side view of a portion of a base plate with an extending boss tower, according to one aspect of the present invention.
Figure 6:
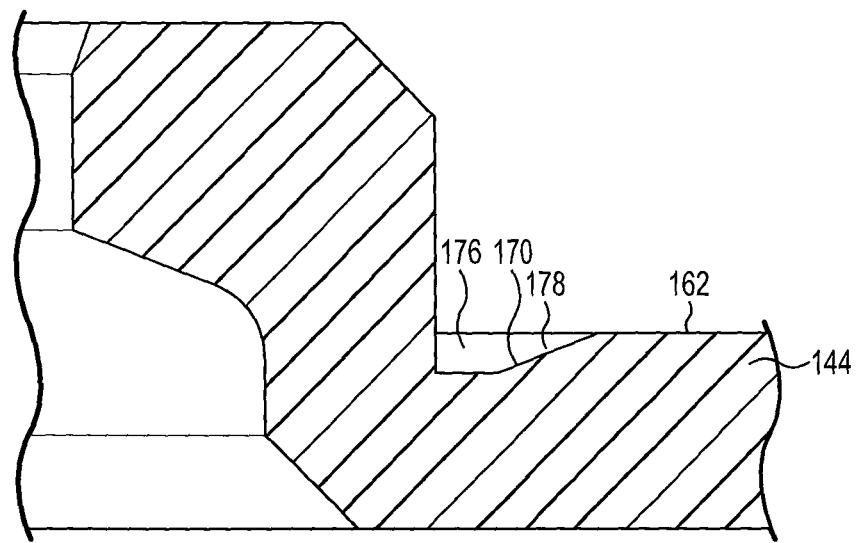
FIG. 6 is an enlarged cross-sectional side view of a portion of the base plate illustrated in FIG. 5.

With additional reference to FIGS. 5 and 6, a cross-sectional view of a portion of base plate 144 and an enlarged portion of that base plate 144 and relief channel 170 are illustrated, respectively, in accordance with an aspect of the invention, including the boss tower 146 and areas of the base plate 144 immediately adjacent to it. As shown, the boss tower 146 includes a central opening or swage hole 148 that extends through both the base plate 144 and the boss tower 146, wherein the illustrated swage hole 148 includes areas of different diameters. In particular, the swage hole 148 includes a first portion 172 having an inner diameter D that is larger than an inner diameter B of a second portion 174, wherein the first portion 172 tapers down in diameter toward the second portion 174 at a bottom transitional angled surface 180 area that is at approximately the horizontal plane of the surface 162 of the base plate 144. However, the bore 148 may instead have a single diameter along its entire height, may include more than two different diameters, may include one or more chamfered areas, or may include other variations in shape and size throughout the height of the bore 148 and base plate 144 (e.g., tapered, irregular, and the like), wherein the bore 148 is sized and shaped to interact with a swaging ball in a swaging procedure, as will be described below.

FIGS. 5 and 6 also illustrate an embodiment of the relief channel or ring 170, which is shown as recessed into the surface 162 of base plate 144. The relief ring 170 has a predetermined depth and width, and can be chosen or designed to have a profile that provides a desired deformation of the base plate 144 during and after the swaging process. In the illustrated embodiment, the relief channel 170 includes an area 176 at which the channel 170 has its deepest dimension, and an area 178 that tapers upwardly from the area 176 and toward the surface 162 of the base plate 144. However, this configuration of the relief channel 170 is only one exemplary configuration; it is understood that the channel 170 may instead include different contours, relative dimensions, etc. Further, while the channel 170 is shown in FIGS. 5 and 6 as being located adjacent to the intersection of the boss tower 146 and the base plate 144, the channel 170 will be spaced at different distances from the perimeter of the boss tower 146 depending on what portion of the channel 170 is being considered. For example, the channel 170 will generally be spaced at the furthest distance from the boss tower 146 at the widest dimension of an oval or elliptical shaped relief channel 170 and will generally be spaced at the closest distance to the boss tower 146 at the smallest dimension of an oval or elliptical shaped relief channel 170.

Figure 7:
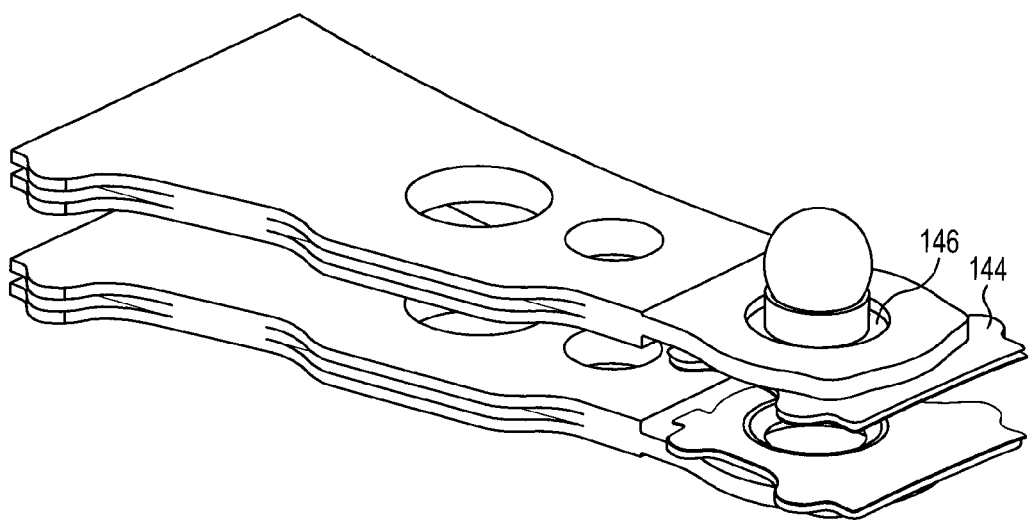
FIG. 7 is an exploded perspective view of a head stack assembly as it can be arranged for a swaging process, according to one aspect of the present invention.

FIG. 7 illustrates an exemplary swaging process, in accordance with the invention. As shown, a swage ball 182 is used to expand a boss tower 146 of a base plate 144 to attach a load beam of a head gimbal assembly (HGA) 184 to an actuator arm or E-block. The base plate 144 includes a relief ring (not visible in this figure) that has a different shape (e.g., oval) than the outer shape of the boss tower 146, as discussed above. In this embodiment, the relief channel is oriented as shown in FIGS. 3 and 4, with the larger dimension of the relief ring being positioned in the pitch direction (i.e., the x-direction). When the swage ball 182 is pressed into the swage hole of the boss tower 146, the larger dimension of the relief ring in the pitch direction results in less deformation of the flange in that direction as compared to the deformation in the roll direction (i.e., the y-direction). Thus, the deformation of the base plate in the pitch and roll is asymmetric, in accordance with the invention.

Figure 8:
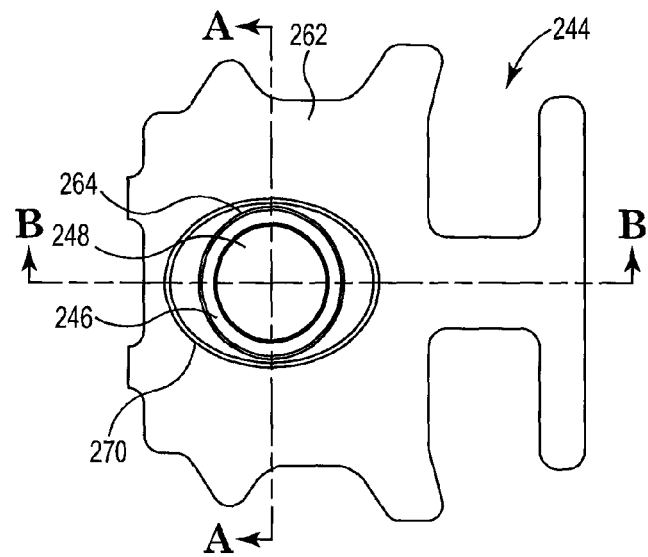
FIG. 8 is a top view of a top view of a base plate for a head stack assembly, according to one aspect of the present invention.
Figure 9:
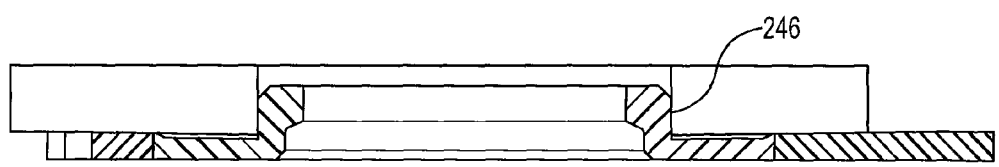
FIG. 9 is a cross-sectional side view taken along section line A-A of the base plate of FIG. 8.
Figure 10:
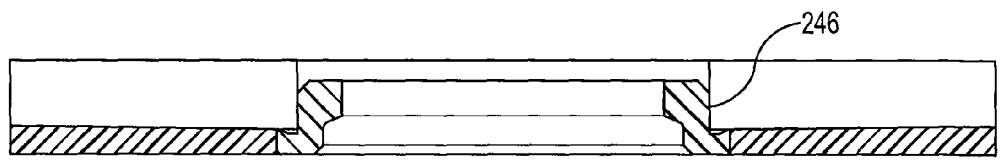
FIG. 10 is a cross-sectional front view taken along section line B-B of the base plate of FIG. 8.

FIGS. 8-10 illustrate a base plate 244, in accordance with an embodiment of the invention. Base plate 244 includes a first or top surface 262, from which a boss tower 246 projects. The boss tower 246 includes a swage hole 248 extending through its height, wherein both the swage hole 248 and an outer surface 264 of boss tower 246 are generally circular in shape, such that the boss tower 246 has a generally cylindrical configuration. The base plate 244 further includes a relief channel or ring 270 that is recessed into the first surface 262, generally surrounding the boss tower 246. The relief channel or ring 270 is oval or elliptical, as shown.

Boss tower 246 includes a central opening or swage hole 248 through which a swaging ball (not shown) will be pressed during the swaging process. FIG. 9 is a cross-sectional side view taken along section line A-A of the base plate of FIG. 8, which illustrates the deformation in one direction after swaging, while FIG. 10 is a cross-sectional front view taken along section line B-B of the base plate of FIG. 8, which illustrates the deformation in a direction that is perpendicular from the deformation shown in FIG. 9. FIG. 9 illustrates a gap between the arm surface and the base plate surface. As is shown in these Figures, changes in the width and/or orientation of the relief ring can be used to provide a corresponding adjustment of the pitch or roll for the flange.

Figure 11:
FIG. 11 is a side view of a deformation profile in the pitch direction of a relief ring that is the same shape as that of the boss tower.
Figure 12:
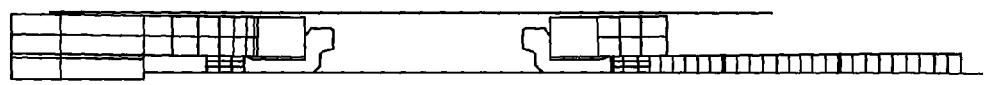
FIG. 12 is a side view of a deformation profile in the pitch direction of a relief ring that is oval or elliptical in shape, according to one aspect of the present invention.

Referring now to FIGS. 11 and 12, FIG. 11 is a side view of a deformation profile 300, in accordance with the invention in the pitch direction of a relief ring that has the same shape as that of the boss tower, which can be compared to FIG. 12, which is a side view of a deformation profile 302 in the pitch direction of a relief ring that is oval or elliptical in shape, in accordance with the present invention. As shown, both the arm tip and base plate deformation when using an oval relief ring with a circular boss tower is less than when a concentrically arranged circular relief ring is used with a circular boss tower.

Figure 13:
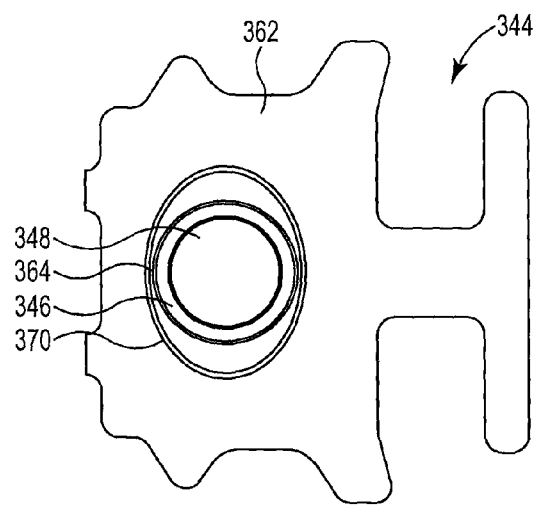
FIG. 13 is a top view of a base plate for a head stack assembly, according to one aspect of the present invention.

FIG. 13 illustrates another embodiment of a base plate 344, in accordance with an embodiment of the present invention. Base plate 344 includes a first or top surface 362, from which a boss tower 346 projects. The boss tower 346 includes a swage hole 348 extending through its height and through the thickness of the base plate 344, wherein both the swage hole 348 and an outer surface 364 of boss tower 346 are generally circular in shape, such that the boss tower 346 has a generally cylindrical configuration. The base plate 344 further includes a relief channel or ring 370 that is recessed into the first surface 362, generally surrounding the boss tower 346. The relief channel or ring 370 is oval or elliptical, as shown. In this embodiment, the relief channel is oriented with the larger dimension of the relief ring being positioned in the roll direction (i.e., the x-direction) and the smaller dimension of the relief ring being positioned in the pitch direction.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. The implementations described above and other implementations are within the scope of the following claims.

What is claimed is:

1. A base plate system comprising:
   a base plate comprising first and second opposite surfaces;
   a boss tower extending from the first surface of the base plate and having an outer surface;
   a swaging hole extending through a height of the boss tower and a height of the base plate; and
   a relief channel recessed in the first surface of the base plate and extending around at least a portion of the outer surface of the boss tower, wherein the relief channel comprises a shape that is different from a shape of the outer surface of the boss tower.

2. The base plate system of claim 1, wherein the outer surface of the boss tower comprises a circular shape.

3. The base plate system of claim 2, wherein the relief channel comprises an oval or elliptical shape.

4. The base plate system of claim 1, wherein the relief channel extends as a continuous channel around the outer surface of the boss tower.

5. The base plate system of claim 1, wherein the swaging hole comprises at least a first section having a first diameter and a second section having a second diameter that is different from the first diameter.

6. The base plate system of claim 1, wherein the swaging hole has a constant diameter from a top of the boss tower to the second surface of the base plate.

7. The base plate system of claim 1, wherein the relief channel extends as a discontinuous channel around the outer surface of the boss tower.

8. The base plate system of claim 1, wherein the relief channel comprises a shape that is non-circular, non-oval, and non-elliptical.

9. The base plate system of claim 1, wherein the relief channel has a symmetrical shape about a center line of the relief channel.

10. The base plate system of claim 1, wherein the relief channel has a non-symmetrical shape about a center line of the relief channel.

11. The base plate system of claim 1, in combination with an actuator arm and head suspension assembly in a head stack assembly, wherein the actuator arm comprises an actuator arm aperture, and wherein the head suspension assembly comprises a load beam having a mounting region with a load beam aperture.

12. The combination of claim 11, wherein the relief channel is oval or elliptical with a longitudinal axis extending along the longest dimension of the relief channel and a lateral axis extending perpendicular to the longitudinal axis, and wherein the longitudinal axis of the relief channel extends along a lateral direction of the head stack assembly.

13. The combination of claim 11, wherein the relief channel is oval or elliptical with a longitudinal axis extending along the longest dimension of the relief channel and a lateral axis extending perpendicular to the longitudinal axis, and wherein the longitudinal axis of the relief channel extends along a longitudinal direction of the head stack assembly.

14. A head stack assembly comprising:
   an actuator arm having an aperture therein;
   a head suspension assembly comprising a load beam having a mounting region with an aperture therein; and
   a base plate adapted to attach the head suspension assembly to the actuator arm, the base plate comprising:
      a boss tower having an outer surface;
      a flange extending outwardly from a first end of the boss tower; and
      a relief channel recessed in a first surface of the flange and extending around at least a portion of the outer surface of the base tower, wherein the relief channel comprises a shape that is different from a shape of the outer surface of the boss tower.

15. The head stack assembly of claim 14, wherein the outer surface of the boss tower comprises a circular shape.

16. The head stack assembly of claim 15, wherein the relief channel comprises an oval or elliptical shape.

17. The head stack assembly of claim 14, wherein the flange is planar.

18. The head stack assembly of claim 14, wherein the relief channel extends as a discontinuous channel around the outer surface of the boss tower.

19. The head stack assembly of claim 14, wherein the relief channel has a symmetrical shape about a center line of the relief channel.

20. The head stack assembly of claim 14, wherein the relief channel has a non-symmetrical shape about a center line of the relief channel.

* * * * *